United States Patent [19]

Kagawa

[11] Patent Number: 5,080,378
[45] Date of Patent: Jan. 14, 1992

[54] SILICON CARBIDE SINTERED BODY FOR MECHANICAL SEAL AND MECHANICAL SEAL USING THE SAME

[75] Inventor: Fumio Kagawa, Shiojiri, Japan

[73] Assignees: Showa Denko K.K.; Tanken Seiko K.K., both of Tokyo, Japan

[21] Appl. No.: 395,611

[22] Filed: Aug. 18, 1989

[30] Foreign Application Priority Data

Aug. 18, 1988 [JP] Japan .................. 63-205856

[51] Int. Cl.⁵ .................. F16J 15/34; C01B 31/36; C04B 35/56
[52] U.S. Cl. .................. 277/96; 277/96.2; 277/DIG. 6; 423/345; 501/81; 501/88
[58] Field of Search .................. 277/96, 96.1, 96.2, 277/235 R, DIG. 6; 501/88, 90, 80-87; 423/345; 51/296, 307

[56] References Cited

U.S. PATENT DOCUMENTS

| | | | |
|---|---|---|---|
| 3,093,382 | 6/1963 | Macks | 277/96 X |
| 3,122,375 | 2/1964 | Greenwald | 277/96 X |
| 3,822,066 | 7/1974 | Keys | 277/96 |
| 3,969,451 | 7/1976 | Floyd et al. | 277/96 X |
| 4,154,787 | 5/1979 | Brown | 501/88 X |
| 4,165,085 | 8/1979 | Persson | 277/96.2 X |
| 4,335,888 | 1/1982 | Ohba et al. | 277/96.1 |
| 4,391,450 | 7/1983 | Beck | 277/96.2 X |
| 4,416,458 | 11/1983 | Takenaka et al. | 277/96.2 X |
| 4,692,418 | 9/1987 | Boecker et al. | 423/345 X |
| 4,756,895 | 7/1988 | Boecker et al. | 423/345 |
| 4,777,152 | 10/1988 | Tsukada | 423/345 X |
| 4,845,058 | 7/1989 | Rogers et al. | 501/88 |
| 4,855,263 | 8/1989 | Kawasaki et al. | 501/90 X |

FOREIGN PATENT DOCUMENTS

| | | |
|---|---|---|
| 2222698 | 11/1972 | Fed. Rep. of Germany ........ 277/96 |
| 62-148384 | 7/1987 | Japan . |
| 62-176970 | 8/1987 | Japan . |
| 62-270481 | 11/1987 | Japan . |
| 63-079775 | 4/1988 | Japan . |

Primary Examiner—William A. Cuchlinski, Jr.
Assistant Examiner—Scott W. Cummings
Attorney, Agent, or Firm—Sughrue, Mion, Zinn, Macpeak & Seas

[57] ABSTRACT

A silicon carbide sintered body for a mechanical seal which has independent pores having an average pore diameter of from 10 to 40 μm and a porosity of from 4 to 13 vol %. The mechanical seal includes a stationary sliding ring and a rotary sliding ring, with at least one of the rings being the silicon carbide sintered body. The silicon carbide sintered body is preferably made of α-silicon carbide powder.

9 Claims, 2 Drawing Sheets

SILICON CARBIDE SINTERED BODY FOR MECHANICAL SEAL AND MECHANICAL SEAL USING THE SAME

BACKGROUND OF THE INVENTION

1. Field of the Invention

The present invention relates to a mechanical seal used as a sealing device for a rotating shaft in a pump, a refrigerator, or the like, more particularly to a sliding part (ring) of a mechanical seal which is made of a silicon carbide sintered body.

2. Description of the Related Art

Materials used for sliding parts (e.g., a stationary ring or rotary ring) of mechanical seals include carbon materials such as bonded carbon bodies and resin-impregnated carbon bodies, cemented carbide bodies, silicon carbide sintered bodies, alumina sintered bodies, and silicon nitride sintered bodies. Increased use is being made of combinations of silicon carbide sintered body parts with other carbon material parts or with other silicon carbide sintered body parts, because silicon carbide sintered parts enable use at a higher PV limiting value (product of pressure applied to sliding surface and circumferential speed of rotary part). A high PV limit enables an increased performance and miniaturization of the sealing device and the apparatus using same. Further, combinations of two silicon carbide sliding parts are frequently used where there is a problem in particle wear due to handling of the slurry.

Silicon carbide sintered bodies have a high hardness, high wear resistance, and a crystal structure with few vitreous grain boundaries. Although silicon carbide sintered bodies are not self-lubricating as are carbon and hexagonal system boron nitride, silicon carbide sintered bodies have a superior smoothness, and therefore, have a small friction coefficient when sliding.

However, when a mirror surface of a silicon carbide sliding part comes into contact with a mirror surface of another silicon carbide sliding part, problems such as abnormal noise (squeaking) and linking at the startup (initial) period easily occur. To solve these problems, an improvement of the dimensional accuracy of the parts, the accuracy of the device and the accuracy of mounting have been proposed. Hard material contacts, however, have a poor familiarity, and thus the problems have not been solved.

When a mirror surface of a silicon carbide sliding part comes into contact with another carbon material sliding part having a self-lubricity, no abnormal noise and linking occur, but carbon blisters appear. This phenomenon starts with a generation of blisters on the sliding surface of the carbon material part, advances to formation of microcracks, and finishes with worm defects (e.g., chipping). Since the defects cause liquid leakage (spill), carbon blisters are a serious defect in mechanical seals. Carbon blisters occur in combinations of carbon material parts and parts of other materials including silicon carbide. It is considered that the frictional heat generated at the startup period causes an alternate expansion and contraction of the carbon material part surface, and that this causes fatigue, and simultaneously, thermal stress failure at the surface. Other factors behind carbon blisters are considered to be (a) thermal decomposition of the impregnating oil in the carbon material part and (b) the explosive reaction of oil held in pores of the carbon material part caused by the frictional heat. Combinations of carbon material sliding parts and other silicon carbide sliding parts are often used in applications involving a high sliding surface pressure. In such cases, the problem of carbon blisters due to the frictional heat at the starting period becomes particularly serious.

The following measures have been proposed to deal with the problem of blisters: (a) increase of strength of the carbon material; (b) improvement of mounting accuracy of two sliding rings to bring them into contact more uniformly; (c) adoption of a double seal; (d) flushing by a low viscosity fluid; and (e) steam heating to raise the sliding surface temperature and lower the viscosity of the sealed liquid. These measures, however, are not sufficient.

In any case, the true solution to the problems is to lower the frictional heat at the start up period, and to lower the frictional heat, it has been proposed to use a reaction-sintered silicon carbide including residual metallic silicon, and to impregnate pores of a porous silicon carbide sintered body with a solid lubricant, as disclosed in Japanese Unexamined Patent Publication (Kokai) Nos. 62-148384, 62-270481, and 63-79775.

Furthermore, a silicon nitride sintered body (ring) for a mechanical seal free from abnormal noise (squeaking) is proposed in Japanese Unexamined Patent Publication No. 62-176970. In this case, one of a pair of sliding parts (rings) is made of a silicon nitride sintered body having either a porosity of from 8% to less than 13% and an average pore diameter of from 50 to 500 $\mu$m or a porosity of 13% or more and an average pore diameter of from 25 to 500 $\mu$m.

A silicon carbide sintered body produced by the reaction sintering method and containing metallic silicon has less drag and abnormal noise than a silicon carbide sintered body produced by a pressureless (atmospheric pressure) sintering method. The former silicon carbide sintered body, however, has an inferior corrosion resistance, and cannot be widely used. Also, to impregnate a porous silicon carbide sintered body with solid or liquid lubricant such as molybdenum disulfide, graphite, boron nitride, or fluorocarbon oil, it is necessary to repeat vacuum impregnation several times, which raises the production cost. Small pores having a pore diameter of less than 50 $\mu$m cannot be impregnated within a short time, whereas large pores having a pore diameter of 50 $\mu$m or more lower the strength and wear resistance of the sintered body.

SUMMARY OF THE INVENTION

An object of the present invention is to provide a silicon carbide sintered body for a mechanical seal which has a high wear resistance and corrosion resistance, maintains its strength without lowering, and prevents linking, drag, abnormal noise, seizing, and blistering.

Another object of the present invention is to provide a mechanical seal in which damage (e.g., wear) to a pair of sliding parts (rings) of a silicon carbide sintered body part and a part of a soft material such as a bonded carbon body or resin-impregnated carbon body or of a hard material such as a silicon carbide sintered body, alumina sintered body, or cemented carbide body, is prevented as much as possible, and in which liquid spillage is prevented.

The present inventor prepared many silicon carbide sintered bodies having pores by using various techniques and investigated the pore characteristics required for preventing drag, abnormal noise, and blistering of the carbon material when the pores are utilized as oil reservoirs.

The above and other objects of the present invention are attained by providing a silicon carbide sintered body for a mechanical seal which has independent pores having an average pore diameter of from 10 to 40 μm and has a porosity of from 4 to 13 vol %.

The mechanical seal includes a pair of a stationary sliding ring and a rotary sliding ring. At least one of the rings is made of the above-mentioned silicon carbide sintered body. The other ring can be made of a material selected from the group consisting of carbon materials including bonded carbon bodies and resin-impregnated carbon bodies, high-density silicon carbide sintered bodies, cast iron, alumina sintered bodies, and cemented carbide bodies.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

Figure 1:
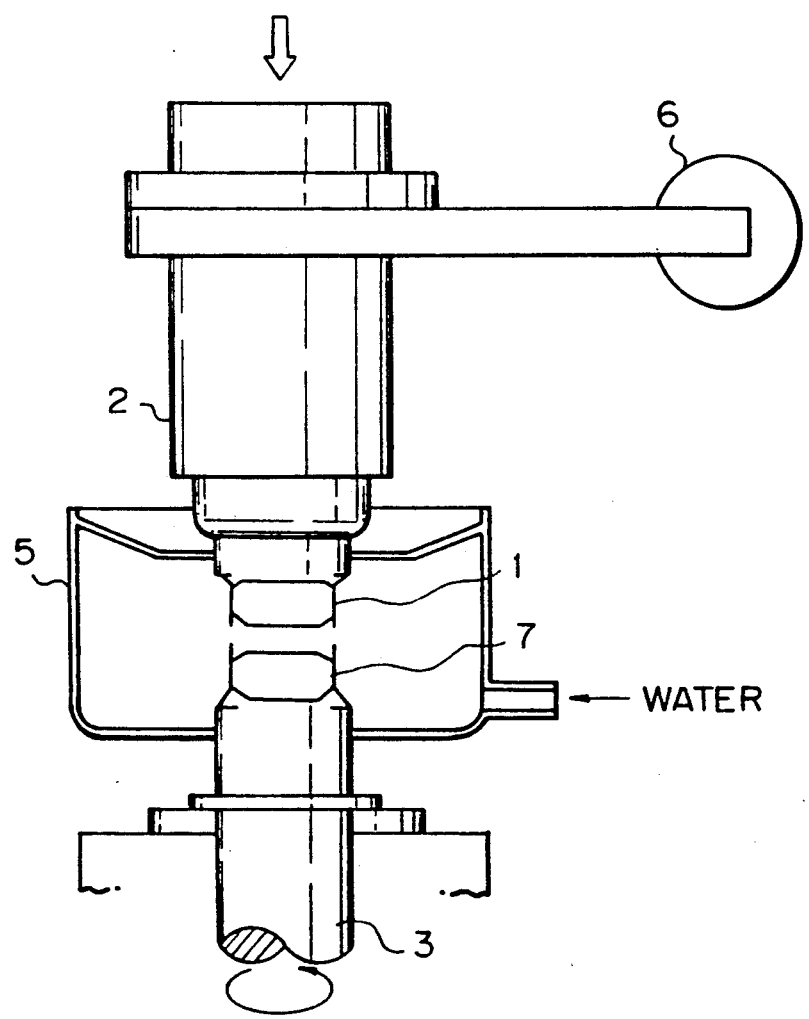
FIG. 1 is a schematic view of a wet system friction coefficient measuring device.

The present invention will be described in more detail below.

As the raw powder of the silicon carbide (SiC) sintered body, α-SiC powder and β-SiC powder may be used, but α-SiC powder is preferable.

The pores must effectively serve as liquid reservoirs, and must have a minimum diameter for easily extruding liquid impregnated therein upon frictional heat at startup, to form a liquid film, and a maximum diameter for maintaining the effect of the liquid reservoirs without runout in a short time and for preventing abnormal wear of the other sliding ring. Therefore, preferably the pores have an average diameter of from 10 to 40 μm, more preferably from 10 to 30 μm. In the case of an average pore diameter of less than 10 μm, the liquid in the pores does not appear on the surface of the sintered body in a short time at startup. In the case of an average pore diameter of more than 40 μm, leakage occurs in the mechanical seal, and the other carbon material sliding ring is considerably worn. When the average pore diameter exceeds 30 μm, the strength of the silicon carbide sintered body is slightly lowered, which causes micro-chipping. Furthermore, in the case of the other carbon material sliding ring, an increased friction coefficient and acceleration of wear may occur.

A cross-section of the silicon carbide sintered body was observed with a scanning electron microscope to measure the diameter of the pores. The average pore diameter was that obtained on the basis of the measured values.

The porosity of the sintered body must have a minimum value to obtain a liquid reservoir effect and have a maximum value to prevent a formation of intercommunicating pores (i.e., to maintain independent (closed) pores). Therefore, it is preferable to set the porosity from 4 to 13 vol %, in particular, from 5 to 10 vol %. In the case of a porosity of less than 4 vol %, the pores do not exhibit the lubrication effect of the liquid reservoir, and in the case of a porosity of more than 13 vol %, the strength of the sintered body is greatly lowered and independent pores become intercommunicating pores, causing a liquid leakage.

A silicon carbide sintered body having a density of 95% of the theoretical density or more is called a "high-density silicon carbide sintered body".

The high-density silicon carbide sintered body usually contains pores having a diameter of 2 μm or less at a porosity of 3 vol % or less at the grain boundaries. Such pores do not give effects similar to those attained in accordance with the present invention.

Bodies having a 5 vol % porosity provide a greater improvement than bodies having a 4 vol % porosity. Where the porosity exceeds 10 vol %, when the other material sliding ring is a silicon carbide sintered sliding ring, micro-chipping occurs.

In general, the porosity of a sintered body is a volume percentage of the sum of open pores and closed (independent) pores to the volume of the sintered body and is obtained by calculation on basis of the sintered density and true density. The pores in the silicon carbide sintered body according to the present invention are almost all independent from each other.

Therefore, the most suitable ranges of the average pore diameter and porosity of the silicon nitride sintered body disclosed in the above-mentioned Japanese Unexamined Patent Publication No. 62-176970 are different from the silicon carbide sintered body according to the present invention.

Regarding the pore shape, the pore must be rounded to avoid stress concentration in a hard material of a silicon carbide sintered body. "Rounded" means that the pore does not have an edge serving as a stress concentrator and has a smooth curved surface.

The methods of forming pores in a silicon carbide sintered body may be roughly classified into two groups: (a) adding a spherical organic material (a large number of organic globulites) to a mixture of sintering raw materials, and calcining the mass to form pores by decomposition and sublimation and (b) inhibiting the densification of a silicon carbide sintered body by changing the sintering conditions to retain pores. In the latter case, for example, there are parameters such as an addition of coarse grains (powder) of a sintering raw material, reduction of sintering aids, raising or lowering of the temperature elevation rate to the sintering temperature, lowering of maximum soaking temperature, and shortening of the maximum soaking time. In this case, the formed pores are generally less rounded and are apt to intercommunicate. Since the former case can easily make the pores more rounded than the latter, it is preferable to use the former process.

The production process for producing a sliding ring of silicon carbide sintered body commonly includes the steps of mixing raw materials (powders) in a ball-mill using water; granulating the mixture by a spray drying method; and compacting the granules into a ring shape with a cold isotactic press or a mold press. Taking the production process into consideration, the organic material to be added should be one which does not dissolve in water and has a suitable heat resistance i.e., will not soften or become fluid at the spray drying step. Preferably, the spherical organic material is made of a synthetic or natural polymer, and may be polystyrene beads made by emulsion polymerization, starch globulites, or pulp globulites.

EXAMPLE 1

α-type silicon carbide (α-SiC) powder having an average grain diameter of 0.45 μm was prepared, and polystyrene beads having grain diameters shown in Table 1 were prepared. Then 100 parts by weight of the α-SiC powder, 0.8 part by weight of boron carbide ($B_4C$) powder, 2.5 parts by weight of carbon black powder, 2.5 parts by weight of polyvinyl alcohol (PVA), and the amounts of polystyrene beads shown in Table 1 were mixed to form mixture samples 1 to 10. Water was added to each mixture to form a slurry having a 40% concentration, and the slurry was stirred in a ball mill for 10 hours and then granulated with a spray dryer.

The obtained granules were loaded in a mold and molded at a pressure of 1.5 ton/cm² to form a green compact. The green compact was sintered at 2050° C. under an argon atmosphere to obtain test piece samples 1 to 10, respectively, of a silicon carbide sintered body as shown in Table 1.

The samples 1 to 6 fall under the present invention, and the samples 7 to 10 were comparative examples. Sample 7 had no polystyrene beads added, sample 8 had smaller size polystyrene beads added, sample 9 had suitable polystyrene beads added in an excess quantity, and sample 10 had larger size polystyrene beads added.

The obtained test piece samples had the properties shown in Table 1. The bulk specific gravity was measured by a water-displacement method, and the average pore diameter was measured by using a scanning electron microscope. The porosity was obtained by calculation on the basis of the theoretical density of silicon carbide of 3.21 g/cm³. The flexural strength was obtained by a method of testing flexural strength of high performance ceramics (JIS R1601-1981), in which a load is applied at a crosshead speed of 0.5 mm/min at the loading points on the test piece, and the maximum load until the test piece breaks is measured.

Each of the test piece samples were ground to dimensions of 30 mm outer diameter, 24 mm inner diameter, and 8 mm thickness, and one side surface (i.e., sliding surface) thereof was lapped to finish the surface to a surface roughness Rmax of 0.05 μm, whereby test piece samples 1 to 10 were prepared for a sliding test.

As shown in FIG. 1, each of the test piece samples 1 to 10 of the silicon carbide sintered body was set in a wet system friction coefficient measuring device as an upper sample 1. The measuring device included a stationary shaft 2, a rotary shaft 3, and a water bath 5. The stationary shaft 2 was provided with a torque detector 6, was loaded with a spring (not shown), and gripped the upper sample 1 at the bottom thereof. The rotary shaft 3 was driven by a motor (not shown) and gripped a lower sample 7 having the same dimensions as the upper sample 1 at the top thereof. The water bath 5 was filled with water and surrounded the upper and lower samples.

The friction coefficient of the upper sample 1 was measured in the following sliding test. The lower sample 7 (i.e., one of a furan resin-impregnated carbon ring as, the test piece sample 7 according to the comparative example or the test piece sample 2 according to the present invention) was set on the top of the rotary shaft 3. The upper sample 1 was brought into contact with the lower sample 2 rotating at a circumferential speed of 5 cm/sec by immersing the sample 1 at a pressure (sliding surface pressure) of 6 kg/cm² into running water having a temperature of 17° C. in the water bath 5. The torque was measured by the torque detector 6 and the friction coefficient calculated on the basis of the measured torque value, to obtain the results shown in Table 2. During the sliding test, the generation of abnormal noise (squeaking) was checked. After the sliding test, the surface condition (wear, chipping) of the upper and lower samples was checked. The results are also shown in Table 2.

TABLE 1

| | Sample No. | Polystyrene beads | | Silicon carbide sintered body | | | |
|---|---|---|---|---|---|---|---|
| | | Grain diameter (μm) | Quantity (Parts by weight) | Bulk specific gravity | Average pore diameter (μm) | Porosity (%) | Flexural strength (kg/mm²) |
| Present invention | 1 | 20 | 7 | 3.06 | 20 | 5 | 40 |
| | 2 | 20 | 11 | 2.94 | 20 | 8 | 30 |
| | 3 | 10 | 12 | 2.95 | 10 | 8 | 40 |
| | 4 | 20 | 19 | 2.80 | 20 | 13 | 22 |
| | 5 | 30 | 11 | 2.94 | 30 | 8 | 28 |
| | 6 | 40 | 11 | 2.94 | 40 | 8 | 25 |
| Comparative example | 7 | — | No addition | 3.12 | 2 | 3 | 45 |
| | 8 | 5 | 11 | 2.96 | 5 | 8 | 38 |
| | 9 | 20 | 26 | 2.74 | 20 | 15 | 18 |
| | 10 | 50 | 11 | 2.95 | 50 | 8 | 20 |

TABLE 2

| Upper sample | | Lower sample | Friction coefficient | Abnormal noise | Surface condition |
|---|---|---|---|---|---|
| Sample | 1 | Resin-impregnated carbon ring | 0.040 | No | No chipping |
| | 2 | | 0.035 | " | " |
| | 3 | | 0.038 | " | " |
| | 4 | | 0.030 | " | " |
| | 5 | | 0.035 | " | No chipping (Slight wear of carbon sample) |
| | 6 | | 0.040 | " | No chipping (Small wear of carbon sample) |
| | 7 | | 0.050 | " | No chipping |
| | 8 | | 0.045 | " | " |
| | 9 | | 0.030 | " | No chipping |

TABLE 2-continued

| Upper sample | Lower sample | Friction coefficient | Abnormal noise | Surface condition |
|---|---|---|---|---|
| | 10 | 0.060 | " | (Large wear of carbon sample) No chipping |
| Sample 1 | Sample 7 | 0.060 | No | (Large wear of carbon sample) No chipping |
| 2 | | 0.050 | " | " |
| 3 | | 0.055 | Faint noise | " |
| 4 | | 0.055 | No | Micro-chipping |
| 5 | | 0.050 | " | No chipping |
| 6 | | 0.050 | " | Micro-chipping |
| 7 | | 0.070 | Large noise | No chipping |
| 8 | | 0.065 | Small noise | " |
| 9 | | 0.040 | No | Much chipping |
| 10 | | 0.050 | " | Much chipping |
| Sample 1 | Sample 2 | 0.050 | No | No chipping |
| 2 | | 0.045 | " | " |
| 3 | | 0.045 | " | " |
| 4 | | 0.040 | " | Micro-chipping |
| 5 | | 0.040 | " | No chipping |
| 6 | | 0.040 | " | Micro-chipping |
| 7 | | 0.050 | " | No chipping |
| 8 | | 0.050 | " | " |
| 9 | | 0.045 | " | Much chipping |
| 10 | | 0.045 | " | Much chipping |

EXAMPLE 2

On a pump type testing device for a mechanical seal, a furan resin-impregnated carbon ring was set as a stationary sliding ring and one of the test piece samples 1, 7, and 10 was set as a rotary sliding ring. The testing device (pump) having a rotary shaft 40 mm in diameter was intermittently operated, to circulate C-heavy oil at a pressure of 10 kg/cm and a rotating speed N of 3000 rpm for 15 minutes, and then stopped for 5 minutes to observe the generation of blisters on the carbon ring. In this case, the resin-impregnated carbon ring had an outside diameter of 60 mm and an inside diameter of 41 mm.

When the mechanical seal was used for viscous liquids, an intermittent operation with frequent stoppages, and a high PV value, blistering of the carbon ring usually occurred within a relatively short period. However, when the test piece sample 1 (silicon carbide sintered body), according to the present invention was used in a mechanical seal operating under the above-mentioned conditions, blistering did not occur even after 100 hours of operation (300 interruptions). At this time, the liquid spill of the mechanical seal was 0.5 cc/hr. The sliding surface of the carbon ring had a dull gloss.

In the case of the mechanical seal using the test piece sample 7 (high-density silicon carbide sintered body) according to the comparative example, leakage occurred after 5 hours of operation (15 interruptions). The mechanical seal was then dismantled to check the carbon rotary ring, and five blisters were found on the sliding surface of the carbon ring.

In the case of a mechanical seal using the test piece sample 10 (having a large average pore diameter) according to the comparative example, after 100 hours of operation, the liquid spill of the mechanical seal was 4 cc/hr. The sliding surface of the carbon rotary ring had no luster and was very worn.

As mentioned above, the use of the sliding ring of the silicon carbide sintered body according to the present invention has the advantages of a prevention of blister generation and a reduction of wear in the carbon material sliding ring, as well as a prevention of linking, chipping, abnormal noise, drag, and seizing.

Figure 2:
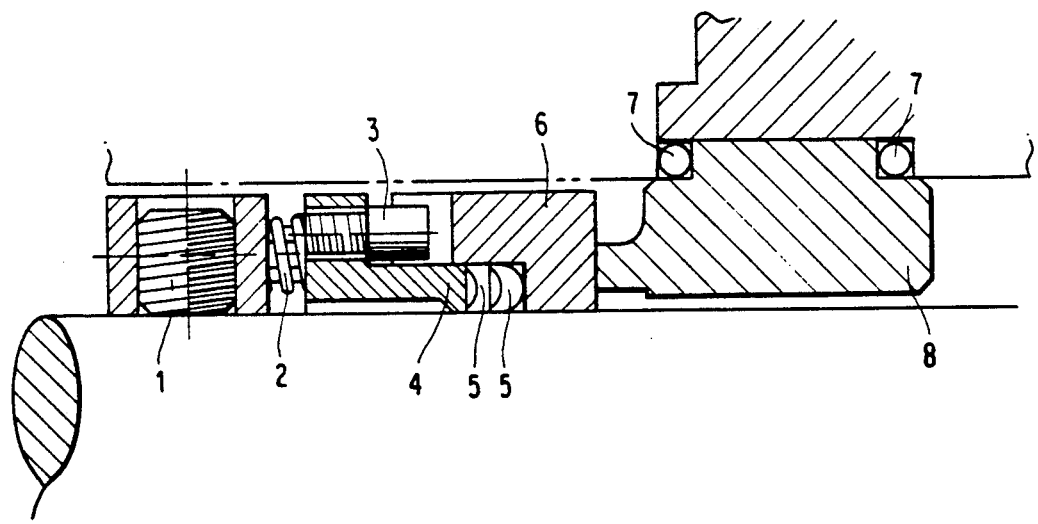
FIG. 2 is a view of a mechanical seal in which the silicon carbide sintered body of the present invention is used.

As shown in FIG. 2, the silicon carbide sintered body is used in a mechanical seal. The mechanical seal of FIG. 2 includes a set screw 1, a spring 2, a drive pin 3, a coup ring 4, shaft packings 5, a seal ring 6, insert packings 7, and an insert 8. The seal ring 6 is the silicon carbide sintered body of the present invention.

While the invention has been described in detail and with reference to specific embodiments thereof, it will be apparent to one skilled in the art that various changes and modifications can be made therein without departing from the spirit and scope thereof.

I claim:

1. A silicon carbide sintered body for a mechanical seal, wherein said sintered body has independent closed and rounded pores having an average pore diameter of from 10 to 40 μm and has a porosity of from 4 to 13 vol %.

2. A silicon carbide sintered body according to claim 1, wherein said porosity is from 5 to 10 vol %.

3. A silicon carbide sintered body according to claim 1, wherein said average pore diameter is from 10 to 30 μm.

4. A silicon carbide sintered body according to claim 1, wherein said sintered body is made of α-silicon carbide powder.

5. A mechanical seal comprising a stationary ring and a rotary ring, wherein at last one of said rings is made of a silicon carbide sintered boy for a mechanical seal, wherein said sintered body has independent closed and rounded pores having an average pore diameter of from 10 to 40 μm and has a porosity of from 4 to 13 vol %.

6. A mechanical seal according to claim 5, wherein both of said rings are made of a silicon carbide sintered body for a mechanical seal, wherein said sintered body has independent closed and rounded pores having an average pore diameter of from 10 to 40 μm and has a porosity of from 4 to 13 vol %.

7. A mechanical seal according to claim 5, wherein one of said rings is made of said silicon carbide sintered body and the other ring is made of a material selected from the group consisting of a carbon material, a high-density silicon carbide sintered body, a cast iron, alumina sintered body, and a cemented carbide body.

8. A mechanical seal according to claim 7, wherein said other ring is made of a resin-impregnated carbon body.

9. A mechanical seal according to claim 7, wherein said other ring is made of the high-density silicon carbide sintered body.

* * * * *